M. SMOLENSKY.
CHECK VALVE.
APPLICATION FILED MAY 31, 1916.
1,222,154.
Patented Apr. 10, 1917.
2 SHEETS—SHEET 1.
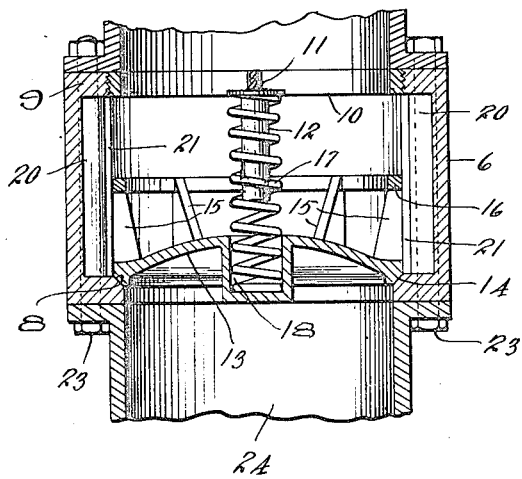
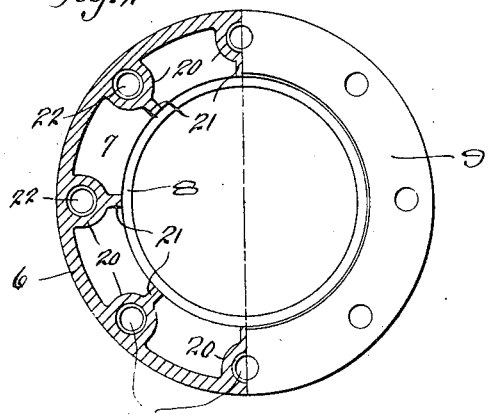
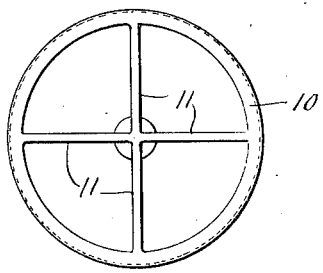
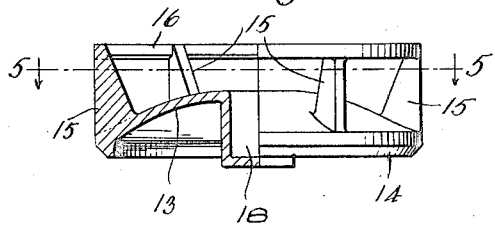
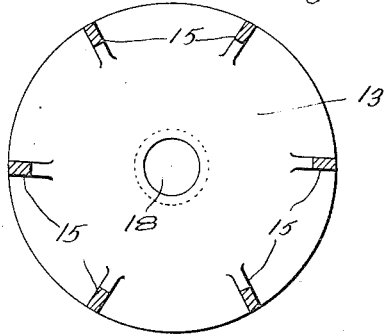
Inventor
Michael Smolensky
By John A. Bornhardt
Attorney

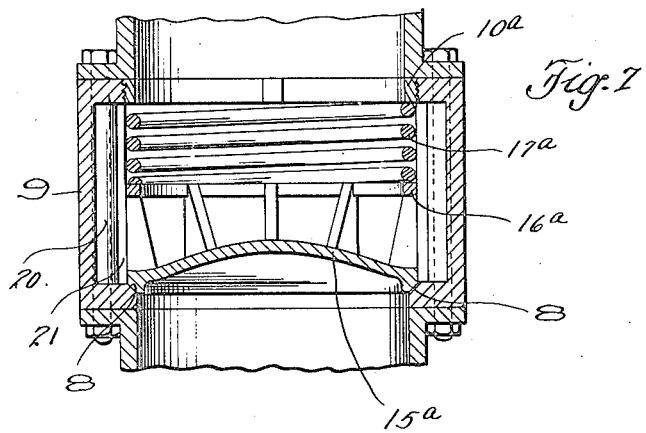
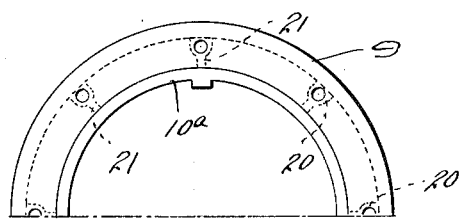
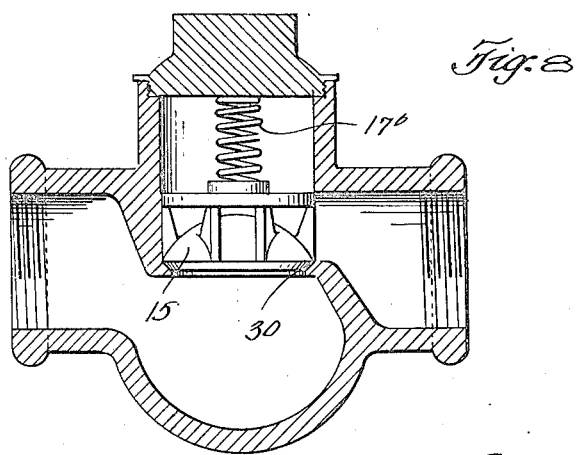

UNITED STATES PATENT OFFICE.

MICHAEL SMOLENSKY, OF CLEVELAND, OHIO.

CHECK-VALVE.

1,222,154.

Specification of Letters Patent.  Patented Apr. 10, 1917.

Application filed May 31, 1916. Serial No. 100,943.

*To all whom it may concern:*

Be it known that I, MICHAEL SMOLENSKY, a subject of Austria-Hungary, residing at Cleveland, in the county of Cuyahoga and State of Ohio, have invented certain new and useful Improvements in Check-Valves, of which the following is a specification.

This invention relates to check valves and has for its object to provide an improved check valve which can be used on high pressure work, and which is provided with improved means for connecting the same in the pipe line. The valve is of special type, designed to give free flow in one direction, and is characterized by simplicity of structure and ease of assembly. A further feature of the valve is that it is caused to rotate as it operates so as to grind off any accumulation of dirt on its seat.

The invention is illustrated in the accompanying drawings, in which:

Figure 1 is a longitudinal section of the valve.

Fig. 2 is a half plan and cross section of the valve casing.

Fig. 3 is a half elevation and section of the valve plug.

Fig. 4 is a plan of a retainer.

Fig. 5 is a section on the line 5—5 of Fig. 3.

Fig. 6 is a plan.

Fig. 7 is a section, of a modification.

Fig. 8 is a section of a further modification.

The valve casing comprises a cylinder barrel 6 having at its lower end an inwardly projecting flange 7 at the margin of which the valve seat 8 is formed. At its upper end it has a flange 9 projecting inwardly and threaded to receive a retainer ring 10 screwed therein. This ring has diametrical cross bars 11 supporting a grooved pin 12 which projects inwardly or toward the valve seat. The interior of the cylinder or casing is provided with a plurality of bosses 20 spaced around the same, and these bosses terminate on their inner faces in ribs 21, said bosses and ribs extending lengthwise or parallel to the axis of the casing, the edges of the ribs defining the chamber in which the valve plug moves and forming guides therefor. The bosses are bored as indicated at 22 to receive bolts 23 by means of which the casing is set between the flanges of adjacent pipe sections 24. This provides a very rigid joint and securely holds the casing in position.

The valve plug consists of a disk or plate 13 dished for strength against back pressure, and with a surface 14 around the edge thereof, ground to fit the seat 8. On the back of the disk or plate 13 are a series of ribs 15, spaced apart, and joined to a ring 16, and the diameter of the disk and the ring is such that they bear against the guide flanges 21 to hold the valve right. The ribs 15 are set on a slight slant, or off-set slightly from radial lines, as shown in Fig. 5, and they are spaced apart to permit flow therebetween when the valve is open. A back-pressure spring 17 is confined between the retainer and the valve disk, being coiled at one end around the pin 12, and seated at the other end in a socket 18 in the disk.

In operation, the valve opens under pressure, against the tension of the spring 17, and when it opens the fluid passes the disk and thence through the spaces between the bosses 20, and thence through the openings between the ribs 15. The flow, also, against the slightly inclined sides of the ribs, acts to turn the disk slightly about its axis, as it operates, to seat it in a slightly different position each time, which tends to preserve its tightness. When the pressure is relieved, the valve is closed by the back-pressure, and the pressure of the spring 17.

In the modified forms shown in Figs. 6 and 7 the spring, instead of being confined between the cross pieces of the retainer and the body of the valve disk, is confined between a retainer ring 10ª and a ring 16ª at the top of the valve, the casing having nevertheless the bosses 20 and ribs 21. In this construction the socket in the valve disk is unnecessary, and the disk is completely cupped. The ribs 15ª serve the same purpose as described above with respect to the ribs 15.

In the modification shown in Fig. 8, a casing of the diaphragm style is shown, the valve seat in the diaphragm being indicated at 30. The bosses 20 and ribs 21 are omitted, the valve sliding in a cylindrical bore, with a spring 17ᵇ behind the same, to close it.

With respect to all the forms, it may be explained that the spring is compressed as the valve opens, and when the pressure is reduced to a sufficient extent the spring closes the valve slightly before the back pressure takes effect. In other words owing to the spring the valve always closes against some little pressure, and the consequence of this is that it operates noiselessly, and seats without a snap or noise which would otherwise result from the closure from back pressure alone. The valve is closed slightly before the back pressure becomes effective. The rotation of the valves act not only to prevent accumulation of dirt on its seat, but also acts to dry or clear it from the liquid.

What I claim as new is:

1. A check valve comprising a cylindrical casing provided with means at its ends for connecting the same between pipe sections said casing having at one end an inwardly projecting flange with a valve seat at its inner edge, and having at the opposite end an inwardly projecting flange threaded at its inner edge, said flanges abutting the pipe sections, a retainer ring screwed into the threaded flanges, spaced guide ribs extending between said flanges, and a valve movable along said ribs, to and from the seat.

2. A valve comprising a casing having a seat and spaced guide ribs extending lengthwise of the casing and rearwardly from the seat and forming passages therebetween, and a valve member comprising a disk coöperating with the seat, a ring behind the disk and adapted to bear against the ribs, and a series of spaced ribs extending between the disk and the ring, said ribs being set at an angle to radial lines, to rotate the valve as it operates.

3. A check valve having a cylindrical casing with interior bosses spaced apart and provided with guides for a valve disk, the bosses being bored lengthwise to receive fastening devices for attaching the casing between pipe sections.

In testimony whereof, I do affix my signature in presence of two witnesses.

MICHAEL SMOLENSKY.

Witnesses:
JOHN BOMMHARDT,
ALTON H. BEMIS.